United States Patent
Schröder

(10) Patent No.: US 7,758,101 B2
(45) Date of Patent: Jul. 20, 2010

(54) ROOF STRUCTURE FOR A RIGID, OPENABLE VEHICLE ROOF

(75) Inventor: Michael Schröder, Osnabrück (DE)

(73) Assignee: Wilhelm Karmann GmbH, Osnabrück (DE)

( * ) Notice: Subject to any disclaimer, the term of this patent is extended or adjusted under 35 U.S.C. 154(b) by 916 days.

(21) Appl. No.: 11/578,616

(22) PCT Filed: Apr. 4, 2005

(86) PCT No.: PCT/DE2005/000593
§ 371 (c)(1),
(2), (4) Date: Oct. 16, 2006

(87) PCT Pub. No.: WO2005/100065
PCT Pub. Date: Oct. 27, 2005

(65) Prior Publication Data
US 2008/0030044 A1    Feb. 7, 2008

(30) Foreign Application Priority Data
Apr. 16, 2004   (DE) ............... 10 2004 018 606

(51) Int. Cl.
B60J 7/14    (2006.01)
(52) U.S. Cl. .................. 296/108; 296/107.17
(58) Field of Classification Search ........... 296/220.01, 296/222, 216.02, 216.03, 108, 107.16, 107.17, 296/116
See application file for complete search history.

(56) References Cited

U.S. PATENT DOCUMENTS

| | | | |
|---|---|---|---|
| 2,768,025 A | 10/1956 | Spear, Jr. et al. | |
| 5,078,447 A | 1/1992 | Klein et al. | |
| 5,195,798 A | 3/1993 | Klein et al. | |
| 5,746,470 A | 5/1998 | Seel et al. | |
| 6,033,012 A | 3/2000 | Russke et al. | |

(Continued)

FOREIGN PATENT DOCUMENTS

DE    42 03 228    8/1993

(Continued)

OTHER PUBLICATIONS

English Translation of International Preliminary Report on Patentability from the International Bureau of WIPO from parent application PCT/DE2005/000593, dated Nov. 1, 2006, 5 pages.

*Primary Examiner*—Dennis H Pedder
*Assistant Examiner*—Melissa A Black
(74) *Attorney, Agent, or Firm*—J-TEK Law PLLC; Jeffrey D. Tekanic

(57) ABSTRACT

A roof structure (20) for an openable, rigid motor vehicle roof comprises a forward roof part (22), forward roof frame parts (24) laterally adjoining the forward roof part (22), a rearward roof part (26) and rearward roof frame parts (28) laterally adjoining the rearward roof part (26), wherein the forward and rearward roof frame parts (24, 28) are pivotable relative to each other about an axis extending perpendicular to the vehicle longitudinal plane and are storable in a position, in which their inner sides are oriented towards each other, and the forward roof part (22) is pivotable relative to the forward roof frame parts (24) and the rearward roof part (26) is pivotable relative to the rearward roof frame parts (28) about respective axes that extend perpendicular to the vehicle longitudinal plane.

20 Claims, 5 Drawing Sheets

U.S. PATENT DOCUMENTS

| | | | |
|---|---|---|---|
| 6,053,560 A * | 4/2000 | Rothe | 296/108 |
| 6,131,988 A | 10/2000 | Queveau et al. | |
| 6,315,349 B1 | 11/2001 | Kinnanen | |
| 6,382,703 B1 | 5/2002 | Queveau et al. | |
| 6,814,391 B2 * | 11/2004 | Biecker et al. | 296/108 |
| 7,063,371 B2 * | 6/2006 | Willard | 296/107.17 |
| 7,325,857 B2 * | 2/2008 | Queveau et al. | 296/108 |
| 7,360,828 B2 * | 4/2008 | Queveau et al. | 296/220.01 |
| 2002/0003355 A1 | 1/2002 | MacFarland | |
| 2002/0003359 A1 | 1/2002 | DeGaillard | |
| 2002/0158485 A1 | 10/2002 | Obendiek | |
| 2004/0004369 A1 | 1/2004 | Neubrand et al. | |
| 2006/0097543 A1 | 5/2006 | Russke | |
| 2006/0131923 A1 * | 6/2006 | Russke et al. | 296/108 |
| 2006/0273618 A1 | 12/2006 | Queveau et al. | |

FOREIGN PATENT DOCUMENTS

| | | |
|---|---|---|
| DE | 198 04 990 | 5/1999 |
| DE | 20313456 U1 | 12/2003 |
| DE | 10248348 A1 * | 5/2004 |
| EP | 1173342 B1 | 8/2007 |
| FR | 2805218 A1 | 8/2001 |
| WO | WO 2004/096592 | 11/2004 |

* cited by examiner

ROOF STRUCTURE FOR A RIGID, OPENABLE VEHICLE ROOF

CROSS-REFERENCE

This application is the US national stage filing of International Application No. PCT/DE2005/000593 filed Apr. 4, 2005, which claims priority to German patent application no. 10 2004 018 606.5 filed Apr. 16, 2004.

TECHNICAL FIELD

The invention concerns a roof structure for an openable, rigid motor vehicle roof, with which a passenger vehicle can be used, in particular, as an open vehicle or as a closed vehicle. The inventive roof structure is particularly applicable to a two-seat convertible.

BACKGROUND ART

A motor vehicle roof with lowerable roof parts is known from DE 296 22 436 U1, which roof has rigid, not-openable lateral roof frame parts. A front and a rear roof part are pivotable about an axis lying perpendicular to the vehicle longitudinal plane.

DE 100 21 464 A1 likewise concerns a vehicle with an openable vehicle roof that has longitudinal roof cross beams. In addition, a movable roof part apparatus is provided for selective closing or at least partial opening of the roof opening and is also provided with a rear window attached to the vehicle roof. The roof part apparatus includes roof part elements that are displaceably guided on lateral guides and are storable in a rear storage space when the roof part apparatus is opened, wherein they are, e.g., folded in an accordion manner or are rolled up like a roller blind. The rear window is lowerable into a position, in which it is removed from the rear window opening of the roof frame and is at least partially disposed under a luggage space lid. The roof elements and/or plates are displaced in the vehicle longitudinal direction along the lateral longitudinal roof cross beams and into the storage space.

DE 42 03 228 C2 concerns a similar construction, by which a folding roof, plate roof or rollable roof is displaced in the vehicle longitudinal direction into a storage space provided on the rear side in the vehicle in order to open the vehicle roof. The B-pillars and C-pillars of the vehicle form a four-bar linkage together with lateral roof frame parts and the rear roof frame part; after lowering the rear window and the rear and front side windows, the four-bar linkage is rearwardly pivotable by means of a drive device.

With the convertible top described in DE 198 04 990 C1, a plurality of connected-together individual slats are provided that are loaded into a storage space in the open position. They are moved therein in the vehicle longitudinal direction from the closed position and wound up around a top roller in a roller shutter manner. The roof frames and the C-pillars of the vehicle are lowerable into the rear portion of the motor vehicle, wherein the front roof frames are pivotable into the vehicle passenger compartment about a vertical axis in the direction toward the rear roof frame. After the pivoting, the front and rear roof frames are displaced together along the inner side of the C-pillar, so that neither the front roof frame nor the rear roof frame protrudes over the C-pillar. Subsequently, the unit comprised of the roof frame and the C-pillar is lowered into the body of the vehicle.

Finally, a convertible vehicle is known from DE 100 63 152 A1, by which a front roof part, which also includes side roof frame parts, and a rear roof part, which likewise includes side roof frame parts, are pivotable towards each other about an axis extending perpendicular to the vehicle longitudinal plane and are storable in a storage space under a rear trunk lid of the motor vehicle.

SUMMARY

The object underlying the invention is to provide a roof structure for an openable, rigid motor vehicle roof that can be completely opened and that requires less storage space in the rear portion of the vehicle when the vehicle roof is in the open state.

In a preferred aspect of the present teachings, a roof structure for an openable, rigid motor vehicle roof preferably comprises a forward roof part, forward roof frame parts laterally adjoining the forward roof part, a rearward roof part and rearward roof frame parts laterally adjoining the rearward roof part. The forward and rearward roof frame parts are preferably pivotable relative to each other about an axis extending perpendicular to the vehicle longitudinal plane and are storable in a position, in which their respective inner sides are oriented towards each other. Further preferably, the forward roof part is pivotable relative to the forward roof frame parts and the rearward roof part is pivotable relative to the rearward roof frame parts about respective axes that extend perpendicular to the vehicle longitudinal plane.

The expressions "front", "rear", and "side" refer to the orientation in the forward driving direction of the vehicle. Accordingly, the vehicle longitudinal direction of the motor vehicle denotes the direction, in which the vehicle drives during straight and forward driving. In addition, the "inner side" of the roof elements is the side that is facing towards the passenger compartment when the roof is closed.

The concept underlying the invention is to provide an opening capability for a rigid motor vehicle roof, whereby the roof parts as well as the roof frame parts are pivoted about respective axes that are perpendicular to the vehicle longitudinal direction. In this case, it is possible to prevent a displacement of the roof parts along the roof frame parts in the vehicle longitudinal direction. Relatively large-area roof parts can therefore be utilized, which contributes to an appealing appearance. Because the roof frame parts are pivotable relative to each other as well as the roof parts are respectively pivotable relative to the individual roof frame parts, the vehicle can thus be completely opened without the roof frame parts hindering the complete opening of the vehicle roof.

BRIEF DESCRIPTION OF THE DRAWINGS

In the following, the invention will be described in an exemplary manner with the assistance of the appended figures, in which.

DETAILED DESCRIPTION OF THE INVENTION

Figure 1:
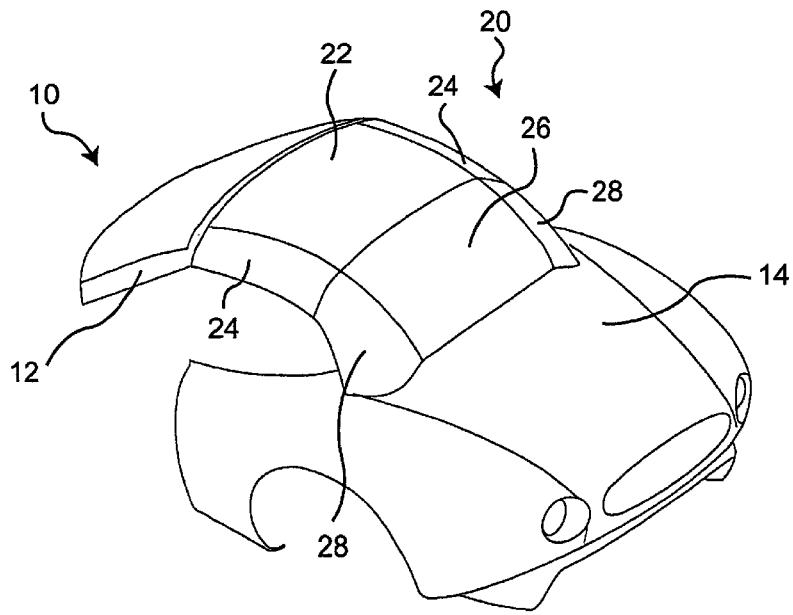
FIG. 1 shows the rear portion of the vehicle with a closed top in perspective view.

FIG. 1 shows, in perspective view, an embodiment of the inventive roof structure for an openable, rigid motor vehicle roof. FIG. 1 shows the rear portion 10 of a vehicle. The roof structure 20, which is disposed adjoining to a windshield frame 12, comprises a forward roof part 22, forward, side roof frame parts 24, a rearward roof part 26, as well as rear, side roof parts 28. The forward edge of the rearward roof part 26 adjoins the forward roof part 22, the forward edge of which abuts on the windshield frame 12 when the vehicle roof is closed. The rear edge of the rearward roof part 26 adjoins the rear trunk lid 14 of the motor vehicle. The side roof frame parts 24, 28 are respectively disposed on the left and the right (viewed in the vehicle forward driving direction) of the forward roof part 22 and the rearward roof part 26, wherein the forward, side roof frame parts 24 extend in the longitudinal direction as far as the forward roof part 22 and the rearward, side roof frame parts 28 extend in the vehicle longitudinal direction as far as the rearward roof part 26.

The forward roof part 22 and the rearward roof part 26 are respectively designed as one-piece and as rigid components (hard top). A rear window is integrated into the rearward roof part 26 and/or the rearward roof part 26 is formed by the rear window. If desired, a sun roof or the like can, e.g., be integrated into the forward roof part 22.

Figure 2:
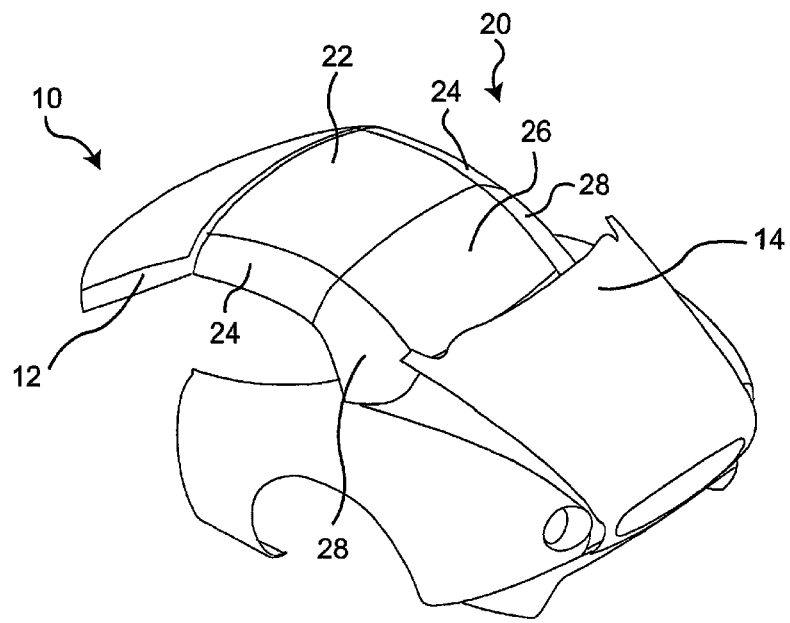
FIG. 2 shows the rear portion of the vehicle at the beginning of the opening movement of the roof.

For opening the roof structure, the rear trunk lid 14 is initially upwardly pivoted as shown in FIG. 2, such that its front-side end portion rises and thus a storage space for the roof structure 20 is made accessible and/or loading of the roof structure into the area under the rear trunk lid 14 is made possible. The pivot axis lies, e.g., on the rear-side edge of the rear trunk lid 14.

Figure 3:
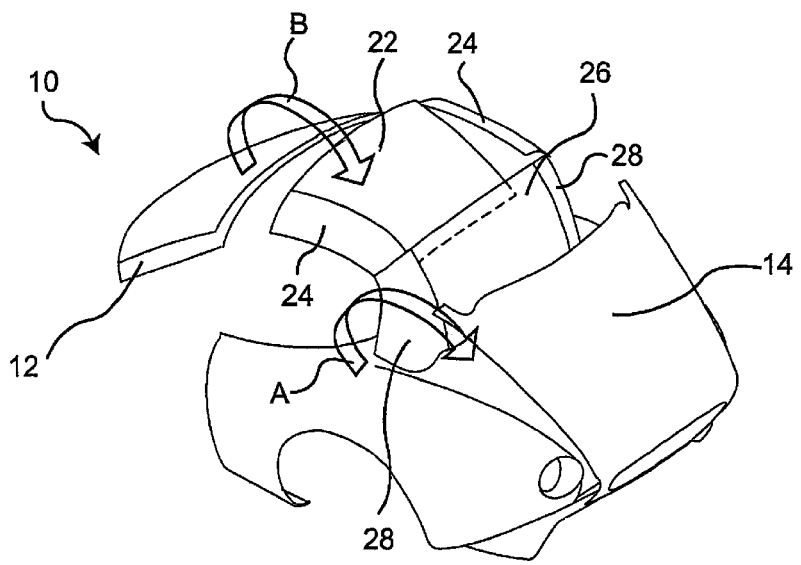
FIG. 3 shows a further advanced state of the opening movement of the roof.

As illustrated in FIG. 3, the forward roof part 22 and the forward, side frame parts 24 are separated either sequentially or simultaneously from the windshield frame 12 and move together with the rearward, side frame parts 28 that are coupled on the rear-side end of the forward roof frame parts 24. The rearward roof frame parts 28 perform a pivoting movement such that they rearwardly pivot toward the vehicle body about their rear-side coupling-axis, whereby they are oriented with their outer sides in the direction of the ground. The forward roof frame parts 24 are moved therewith due to their connection to the rearward roof frame parts 28; due to the hinge connection between the forward roof frame parts 24 and the rearward roof frame parts 28, the forward roof frame parts 24 are simultaneously pivoted in the direction opposite to the pivoting direction of the rear, side frame parts 28, so that the bottom sides of the forward roof frame parts 24 approach the upwardly-oriented undersides of the rear, side roof frame parts 28. When one views the vehicle from a side view toward the left outer side of the vehicle, the rear, side roof frame parts pivot in a direction A relative to the vehicle body in the clockwise direction, while the forward, side roof frame parts 24 pivot relative to the rear, side roof frame parts 28 in a direction opposite to the clockwise direction.

In the simplest case, the connection between the roof frame parts 24, 28 and the roof parts 22, 26 is a hinge. However, in the alternative, scissors mechanisms could, e.g., also be provided, which means that the pivot axis would migrate relative to the roof frame parts and/or the roof parts.

At the same time, the forward roof part 22 performs a pivoting movement relative to the forward, side roof frame parts 24. In the illustrated embodiment, the pivot axis and the hinge point lie between the forward roof part 22 and the forward roof frame parts 24 on a forward end portion of the forward roof part 22, i.e. clearly displaced forwardly relative to the middle of the forward roof part 22. At the beginning of the pivoting movement of the roof structure 20, the position of the rearward roof part 26 relative to the rearward roof frame parts 28 remains unchanged, i.e. the rearward roof part 26 performs the pivoting movement that is shown by the arrow A. By this pivoting movement, the forward roof part 22 moves to a position, in which it is parallel to the rearward roof part 26 and such that its outer-side surface is oriented towards the inner-lying surface of the rearward roof part 26. When viewed from a side view towards the left side of the motor vehicle, the forward roof part thus pivots relative to the forward roof frame part 24 in a direction B in the clockwise direction.

Figure 4:
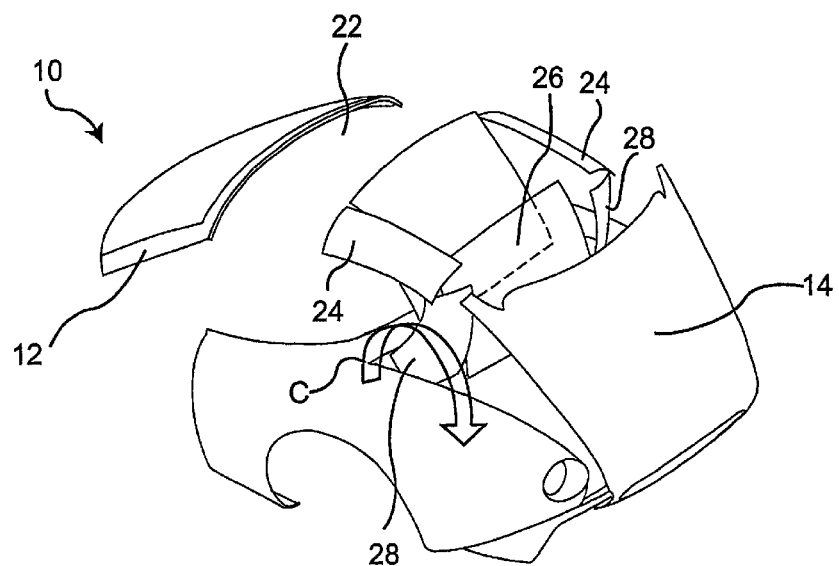
FIG. 4 shows a still further advanced state of the opening movement of the roof structure.

In the further progression of the opening movement of the roof structure 20, which is illustrated in FIG. 4, the rearward roof part 26, which includes a hinge 29 defining axis and connecting the rearward roof part 26 to a central portion of the rear, side roof frame parts 28 in the vehicle longitudinal direction, performs a rotational movement about this axis, which is shown in FIG. 4 with the arrow C. The direction C of the pivoting movement is thus opposite to the pivoting movement of the forward roof part 22 relative to the forward roof frame parts 24. When viewed from a side view towards the left side of the motor vehicle, this means that the rearward roof part 26 is offset relative to the rear, side roof frame parts 28 in a direction opposite to the clockwise direction. As a result, the forward and the rearward roof parts 22, 26 remain nearly parallel to each other, while the forward roof frame parts 24 and the rearward roof frame parts 28 are further folded on top of each other and are loaded into the rear portion of the vehicle, in particular under the rear trunk lid 14.

Figure 5:
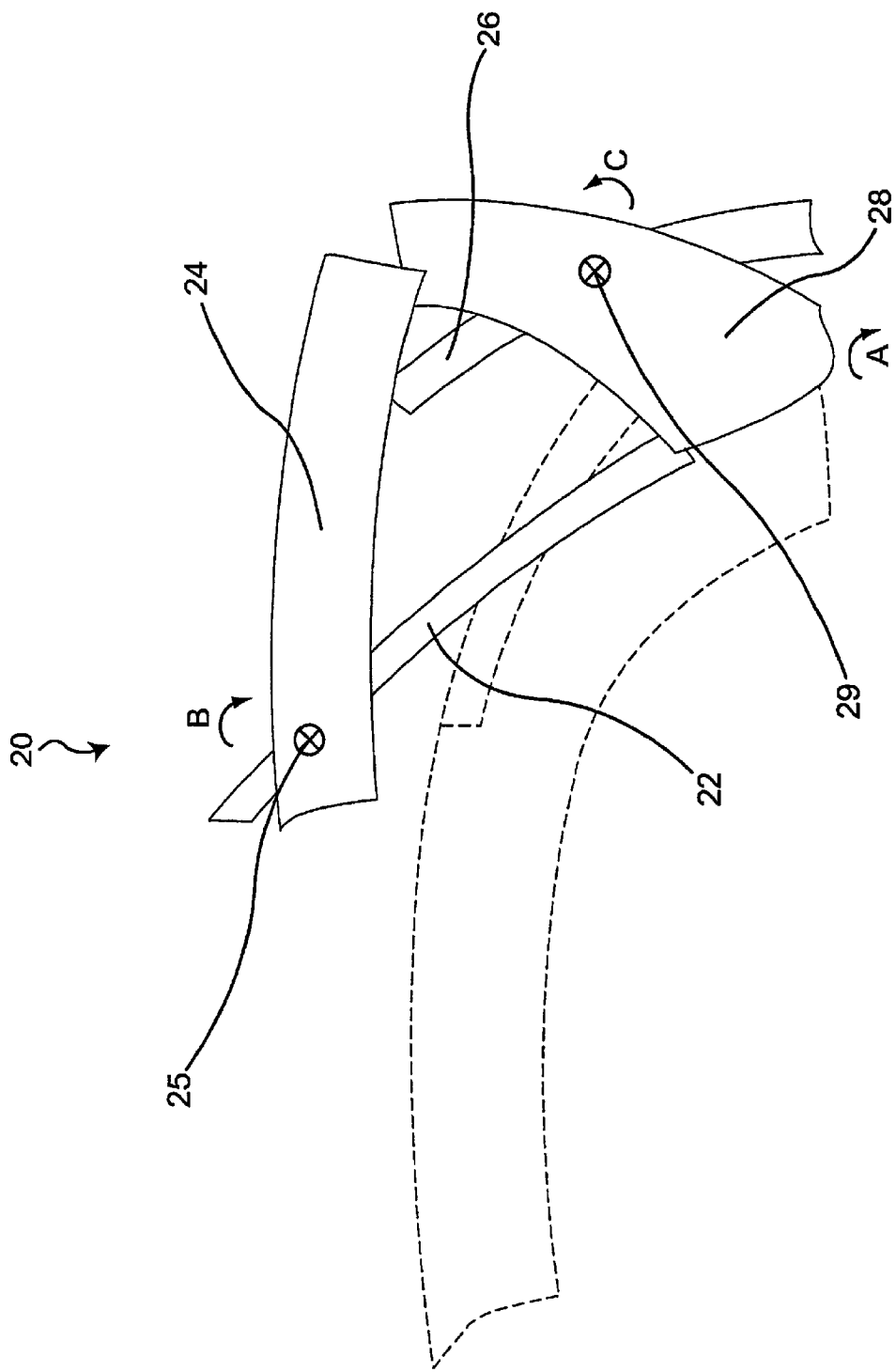
FIG. 5 shows a side view of the kinematics of the inventive roof structure.

In FIG. 5, a side view of the basic components of the roof structure (viewed in a direction toward the left side of the motor vehicle) is illustrated. In FIG. 5, the closed position of the roof is indicated with dashed lines. The position of the roof elements corresponding to the opened state of FIG. 4 are provided with solid lines.

Figure 6:
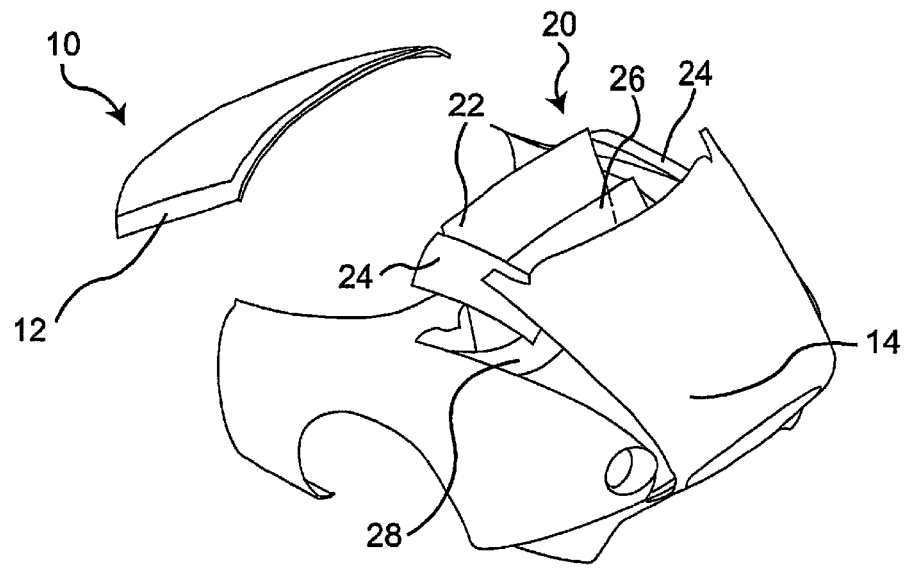
FIG. 6 shows a perspective view of the rear portion of the vehicle when the roof is nearly completely opened.
Figure 7:
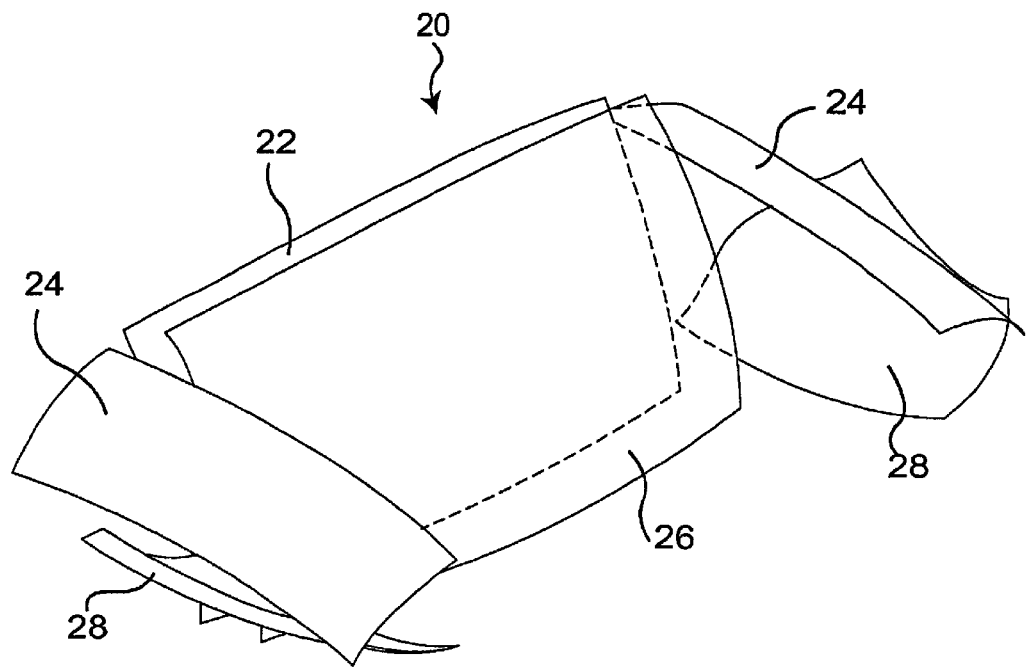
FIG. 7 shows the end position of the roof structure when the vehicle roof is opened, wherein the rear trunk lid and the fender area of the vehicle are omitted.
Figure 8:
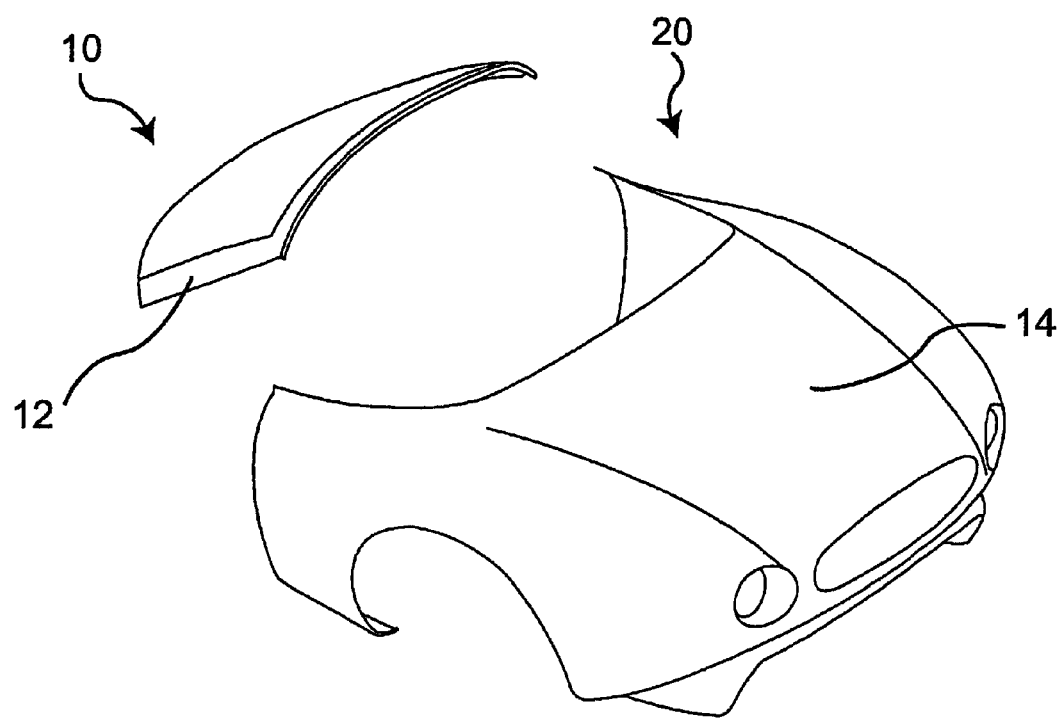
FIG. 8 shows the vehicle with the inventive roof structure when the roof is opened.

By further continued opening movements, the roof structure 20 eventually reaches the position illustrated in FIG. 6, in which the forward roof part 22 is brought parallel to, and in front of, the rearward roof part 26 and is positioned behind the rear seat (not illustrated) of the vehicle. In this process, the roof frame parts 24, 28 are folded on top of each other. FIG. 7 also shows this end state, i.e. the fully-opened roof structure without the rear trunk lid and the fender area.

For concluding the opening movement, the rear trunk lid 14 is finally closed, whereby the roof frame parts are concealed thereunder in their folded state. The luggage space is accessible without loading assistance.

The closing movement of the roof structure proceeds in the reversed sequence.

The basic aspect of the invention lies in providing a fully openable vehicle roof, in particular for a two-seat motor vehicle (roadster), that requires fewer components and by means of which, large surface-area, rigid roof parts can be stored in the rear portion of the vehicle for opening the vehicle roof.

REFERENCE NUMBER LIST

10 Rear portion
12 Windshield frame

14 Rear trunk lid
20 Roof structure
22 Forward roof part
24 Forward, side roof frame part
25 Hinge point between forward roof part and forward roof frame part
26 Rearward roof part
28 Rear, side roof frame part
29 Hinge point between rearward roof part and rearward roof frame part

The invention claimed is:

1. A roof structure for an openable, rigid roof of a motor vehicle, comprising:
   a forward roof part,
   forward roof frame parts laterally and pivotably adjoining the forward roof part,
   a rearward roof part and
   rearward roof frame parts laterally and pivotably adjoining the rearward roof part,
   wherein the forward roof frame parts are pivotable relative to the rearward roof parts about an axis extending perpendicular to a longitudinal plane of the vehicle,
   the forward and rearward frame parts are storable in a position such that respective inner sides of the forward frame parts are oriented towards respective inner sides of the rearward frame parts in the storage position of the roof structure,
   the forward roof part is pivotable relative to the forward roof frame parts and the rearward roof part is pivotable relative to the rearward roof frame parts about respective axes that extend perpendicular to the longitudinal plane of the vehicle, and
   the roof structure is configured such that, during a roof opening operation, the pivoting direction of the forward roof part relative to the forward roof frame parts is opposite to the pivoting direction of the rearward roof part relative to the rearward roof frame parts.

2. A roof structure according to claim 1, wherein, in an open position of the roof structure, the forward roof part and the rearward roof part are arranged and constructed to be positioned in substantially vertical positions behind a passenger compartment of the vehicle.

3. A roof structure according to claim 2, wherein, in the open position of the roof structure, the forward roof part lies forward of the rearward roof part in the forward driving direction of the vehicle and an underside of the rearward roof part faces an upper side of the forward roof part.

4. A roof structure according to claim 3, wherein the forward roof part is pivotable relative to the forward roof frame parts about a first axis that lies substantially perpendicular to the vehicle longitudinal direction, the first axis being movable with the roof frame parts and the roof part and being defined within a forward portion of the forward roof frame parts and the forward roof part in the vehicle longitudinal direction.

5. A roof structure according to claim 4, wherein the rearward roof part is pivotable relative to the rearward roof frame parts about a second axis that lies substantially perpendicular to the vehicle longitudinal direction, the second axis being movable with the roof frame parts and the roof part and being defined within a middle portion of the rearward roof frame parts and the rearward roof part in the vehicle longitudinal direction.

6. A roof structure according to claim 1, wherein, in the open position of the roof structure, the roof frame parts are storable in a rear portion of the vehicle under a rear trunk lid with the respective undersides of the roof frame parts folded on top of each other.

7. A roof structure according to claim 6, wherein the forward roof part and the rearward roof part are each one-piece roof elements.

8. A roof structure according to claim 7, wherein the forward roof part and the rearward roof part are each rigid components.

9. A roof structure according to claim 1, wherein the roof structure is arranged and constructed such that, in its open position, the forward roof part and the rearward roof part are storable in substantially vertical positions.

10. A roof structure according to claim 1, wherein the roof structure is arranged and constructed such that, in its open position, the forward roof part lies forward of the rearward roof part in the forward driving direction of the vehicle and an underside of the rearward roof part, which underside is oriented towards a vehicle passenger compartment in a closed position of the roof structure, faces an upper side of the forward roof part, which upper side is oriented to face in a direction opposite to the passenger compartment in the closed position of the roof structure.

11. A roof structure according to claim 1, wherein the forward roof part is pivotable relative to the forward roof frame parts about a first axis that lies substantially perpendicular to the vehicle longitudinal direction, the first axis being movable with the roof frame parts and the roof part and being defined within a forward portion of the forward roof frame parts and the forward roof part in the vehicle longitudinal direction.

12. A roof structure according to claim 1, wherein the rearward roof part is pivotable relative to the rearward roof frame parts about a second axis that lies substantially perpendicular to the vehicle longitudinal direction, the second axis being movable with the roof frame parts and the roof part and being defined within a middle portion of the rearward roof frame parts and the rearward roof part in the vehicle longitudinal direction.

13. A roof structure according to claim 1, wherein the roof structure is arranged and constructed such that, in its open position, the forward and rearward roof frame parts are storable in a rear portion of the vehicle under a rear trunk lid with the respective undersides of the roof frame parts folded on top of and facing each other.

14. A roof structure according to claim 1, wherein the forward roof part and the rearward roof part are each one-piece roof elements.

15. A roof structure according to claim 1, wherein the forward roof part and the rearward roof part are each rigid components.

16. A roof structure according to claim 1, wherein the respective rearward roof frame parts are fixedly, pivotably connected to the rearward roof part such that the rearward roof part does not displace relative to the rearward roof frame parts during the roof opening operation.

17. A convertible roof for a vehicle comprising:
   a forward roof part arranged and constructed to abut a windshield frame in a closed position of the roof,
   first and second forward roof frame parts pivotably connected to respective lateral sides of the forward roof part, the first and second forward frame parts being arranged and constructed to abut respective side windows of the vehicle when the roof is disposed in the closed position,
   a rearward roof part arranged and constructed to adjoin and pivot with respect to a rear trunk lid, and
   first and second rearward roof frame parts pivotably connected to respective lateral sides of the rearward roof part, wherein the first and second forward roof frame parts are pivotable relative to the respective first and second rearward roof parts about an axis extending perpendicular to a longitudinal plane of the vehicle, the forward and rearward frame parts are storable in a folded, roof open position such that respective inner sides of the forward frame parts are oriented towards respective inner sides of the rearward frame parts, the respective inner sides facing a passenger compartment of the vehicle in the roof closed position, the forward roof part is pivotable relative to the first and second forward roof frame parts about a first axis that extends perpendicular to the longitudinal plane of the vehicle, and the rearward roof part is pivotable relative to the first and second rearward roof frame parts about a second axis that extends perpendicular to the longitudinal plane of the vehicle, and the convertible roof is configured such that, during a roof opening operation, the pivoting direction of the forward roof part relative to the forward roof frame parts is opposite to the pivoting direction of the rearward roof part relative to the rearward roof frame parts.

18. A convertible roof according to claim 17, wherein the forward and rearward roof parts are each rigid, one-piece elements, and the rearward roof part comprises a rigid rear window.

19. A convertible roof according to claim 18, wherein the forward roof part and the rearward roof part are arranged and constructed to be stored in substantially vertical positions in the roof open position and such that the forward roof part lies forward of the rearward roof part in the forward driving direction of the vehicle, and wherein in the roof open position, an underside of the rearward roof part, which underside is oriented towards the vehicle passenger compartment in the roof closed position, faces an upper side of the forward roof part, which upper side is oriented to face in a direction opposite to the passenger compartment in the roof closed position.

20. A convertible roof according to claim 17, wherein the first and second rearward roof frame parts are fixedly, pivotably connected to the rearward roof part such that the rearward roof part does not displace relative to the rearward roof frame parts during the roof opening operation.

* * * * *